United States Patent [19]

Stashko

[11] Patent Number: 4,648,755
[45] Date of Patent: Mar. 10, 1987

[54] MULTIPLE INSERT END MILL

[75] Inventor: Daniel R. Stashko, Holly, Mich.

[73] Assignee: GTE Valeron Corporation, Danvers, Mass.

[21] Appl. No.: 754,993

[22] Filed: Jul. 15, 1985

[51] Int. Cl.⁴ ............................................. B26D 1/00
[52] U.S. Cl. ...................................... 407/36; 407/42; 407/59
[58] Field of Search ....................... 407/40, 42, 54, 59, 407/50, 56, 58, 36; 408/713

[56] References Cited

U.S. PATENT DOCUMENTS 2,549,251  4/1951  Skelton .................................. 407/59
3,588,977  6/1971  Bellingham et al. ................. 408/186

FOREIGN PATENT DOCUMENTS 217211  12/1983  Japan ................................... 409/137

Primary Examiner—Leonidas Vlachos
Attorney, Agent, or Firm—Lloyd M. Forster

[57] ABSTRACT

An indexable insert end mill having multiple triangular inserts spaced axially in overlapping cutting relation in isolated pockets arranged along a gradual helical angle extending axially of the end mill such pattern of axially spaced cutters being repeated at three 120° circumferentially spaced positions on the periphery of the body. In a typical case the three helical rows of inserts each has five inserts equally spaced axially in overlapping relation and circumferentially in 40° increments so that three effective teeth are provided at each of the five axial positions.

5 Claims, 3 Drawing Figures

MULTIPLE INSERT END MILL

BACKGROUND OF THE INVENTION

Numerous companies have directed considerable effort toward designing small diameter long length indexable insert end mills. Small diameter end mills in particular have provided space limitations relative to the provision of flutes, gullets, insert pockets and provisions for insert retention which impose on the mass and strength of the cutter body proper.

In providing multiple teeth both circumferentially and axially it has been common practice, in order to derive three effective teeth circumferentially, for example in a long flute end mill, to provide six flutes in the body with adjacent inserts in each flute spaced apart axially at some distance less than the insert edge length; then, in alternate flutes, inserts are located to span the gap left between any two inserts in the adjacent flute. The result is that two flutes are required to achieve one effective flute.

It has also been common practice to mill helical or step flutes entirely along the axial length weakening the cross section torsional and bending strengths. In order to overcome the weakening effect of continuous helical flutes, prior art U.S. Pat. No. 4,093,392 provided individual isolated pockets for each of multiple round inserts arranged in a single circumferential helical path with staggered entry in each successive convolution involving four successive circumferentially spaced inserts thereby providing in effect four gradual helix interrupted axial flutes with intervening wall equal to the full diameter of the body extending between axially adjacent round cutter pockets.

U.S. Pat. No. 4,182,587 discloses a milling cutter employing multiple quadrilateral axially adjacent cutters extending along one edge of each of a plurality of continuous flutes forming a gradual helical angle. U.S. Pat. No. 4,265,574 discloses a combined boring and milling tool employing four turnable cutter blades each shaped like an equilateral triangle. Two of the blades with cutting edges extending parallel to the axis are circumferentially aligned and axially spaced, with a third blade spaced 180° circumferentially in an overlapping relation axially also having a cutting edge extending parallel of the axis, while the fourth blade has a cutting edge extending radially slightly beyond the end of the tool shank in the same plane as the third.

SUMMARY OF THE PRESENT INVENTION

The present invention employs a plurality of triangular inserts spaced axially in overlapping cutting relation in isolated pockets with chip clearing gullets which are in turn substantially isolated and arranged along a gradual helical angle extending axially of the end mill. Such pattern of axially spaced cutters is repeated at three 120° circumferentially spaced positions on the periphery of the body so that, in a typical case with the three helical rows of inserts each having a five inserts equally spaced axially in overlapping relation and circumferentially in 40° increments, three effective teeth are provided at each of the five axial positions.

DETAILED DESCRIPTION OF A PREFERRED EMBODIMENT

Figure 1:
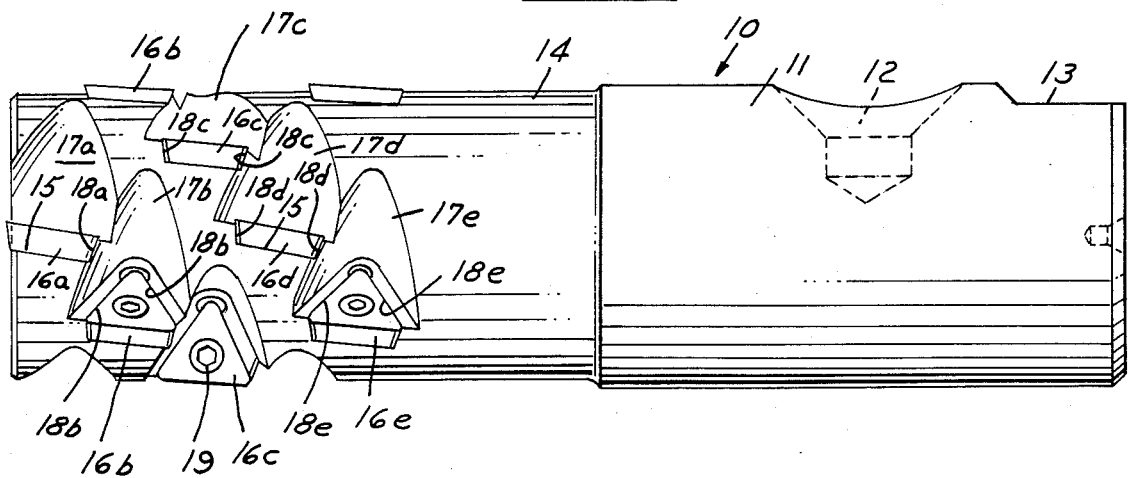
FIG. 1 is a side elevation of an end mill constructed in accordance with the present invention.

With reference to FIG. 1 it will be understood that 15 cutter inserts are arranged in three rows with five inserts in each row having cutting edges overlapping in axial relationship and with three 120° circumferentially spaced inserts at each of the five axially spaced positions. End mill body 10 has cylindrical shank end 11 adapted for engagement in a tool holder with provision for axial retention by a screw engaging countersunk recess 12 and including drive flat 13. Cutting end 14 is provided with insert seats 15 for 15 inserts numbered 16a–16e, the progressive letters indicating progressive equal axial locations. Chip clearance gullets 17a–17e project from insert pocket shoulders 18a–18e. Each insert is retained in its pocket by a center screw typically shown at 19.

In a typical end mill having a 1.250" cutting diameter, 15 pockets are provided for 0.250" I.C. triangular inserts 0.094" thick having 15° positive sides with 0.0312" corner radii and "iso" screw holes. The pockets provide a 10° positive axial rake and 5° negative radial rake for each insert.

Figure 2:
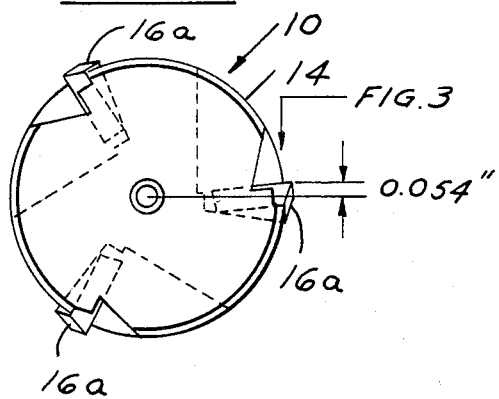
FIG. 2 is an end view of the end mill shown in FIG. 1.
Figure 3:
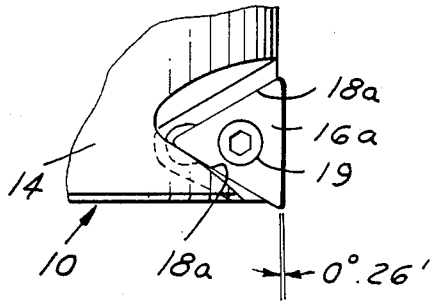
FIG. 3 is a fragmentary face view of a single triangular cutter insert located at the cutting end of the end mill shank.

Correction angle of 0° 26 minutes, as shown in FIG. 3, together with cutting corner positioned 0.054" ahead of centerline, as shown in FIG. 2, enable the cutter to cut a square shoulder within 0.001".

A second typical example which has been effectively tested with excellent results incorporates 0.375" I.C. inserts with 0° radial rake and 20° axial rake in a 2" diameter end mill. There are, of course, other variations possible within the scope of the invention.

From the foregoing description it will be seen that an end mill has been provided with three effective teeth for each axial location and a like number of rows of teeth, the adjacent inserts in each row having overlapping relation while insert pockets and gullets are substantially isolated to retain maximum torque and bending strength of the full diameter of cutter body.

I claim:

1. An indexable insert end mill comprising an annular cylindrical body, a plurality of individual insert pockets formed in the cylindrical periphery of said body, each of said pockets having a seat for holding an insert with its cutting face in a substantially axial plane modified to the extent of any axial and radial rake angles which are the same for every insert, an indexable triangular straight cutting edge insert retained in each pocket by a central screw with a single cutting edge extending substantially parallel to the axis of the endmill projecting beyond said periphery, said cutting edge having a lead corner spaced ahead of a radial in the cutting direction, a positive axial rake, and an axial correction angle of less than one degree at said lead corner to position the cutting edge to enable the end mill to cut approximately a square shoulder, each pocket having a chip clearance wall associated therwith, said wall providing chip clearance space projecting from the entire cutting face to the periphery of said body, each pocket with its chip clearance wall being substantially isolated from every other pocket by surrounding cylindrical periphery of said body, said insert pockets being provided in three equally circumferentially spaced rows, each row extending with a plurality of axially spaced inserts in a helical path, each row having insert pockets in like axial positions, and said insert pockets in each row being uniformly spaced with active cutting edges of adjacent inserts in overlapping relationship in an axial direction, and angularly spaced in the order of forty degrees in a circumferential direction on the helical path of said row.

2. The end mill of claim 1 wherein each of said pockets is provided with a negative radial rake.

3. The end mill of claim 1 wherein each of said pockets is provided with a positive axial rake in the order of ten degrees and a five degree negative radial rake.

4. An end mill as set forth in claim 1 wherein each of the pockets is provided with a positive axial rake in the order of 20°.

5. An end mill as set forth in claim 1 wherein each of the pockets is provided with a positive axial rake in the order of 10° and with a 0° radial rake.

* * * * *